United States Patent
Sugimoto

[11] Patent Number: 6,063,000
[45] Date of Patent: May 16, 2000

[54] LIMITED SLIP DIFFERENTIAL GEAR

[75] Inventor: Kazuaki Sugimoto, Tokyo, Japan

[73] Assignee: Kabushiki Kaisha Route Six, Tokyo, Japan

[21] Appl. No.: 09/258,103

[22] Filed: Feb. 25, 1999

[30] Foreign Application Priority Data

Feb. 27, 1998 [JP] Japan ................................ 10-64139

[51] Int. Cl.[7] .................................................. F16H 1/45
[52] U.S. Cl. ......................... 475/231; 475/233; 475/238
[58] Field of Search .................................. 475/231, 233, 475/234, 235, 236, 238

[56] References Cited

U.S. PATENT DOCUMENTS

| | | | |
|---|---|---|---|
| 3,264,900 | 8/1966 | Hartupee ........................... | 475/231 X |
| 4,914,980 | 4/1990 | Taureg et al. ..................... | 475/231 X |
| 4,939,953 | 7/1990 | Yasui ................................. | 475/233 |
| 4,978,329 | 12/1990 | Yasui et al. ...................... | 475/231 X |
| 5,102,378 | 4/1992 | Gobert .............................. | 475/231 |
| 5,897,453 | 4/1999 | Mimura ............................ | 475/230 X |

FOREIGN PATENT DOCUMENTS 3001939  6/1994  Japan.

*Primary Examiner*—Khoi Q. Ta
*Attorney, Agent, or Firm*—Flynn, Thiel, Boutell & Tanis, P.C.

[57] ABSTRACT

A limited slip differential gear that is simple in construction, small in size and light in weight is provided. The limited slip differential gear includes a pair of divided gear cases that are turned by a driving force of an engine. A pressure ring provided in one of the gear cases is movable in the direction of the wheel axles. Pinion shafts each have an end that is freely engageably supported between the pressure ring and the gear cases. Pinion gears are turnably supported by the pinion shafts. A pair of side gears mesh with the pinion gears positioned therebetween to transmit the driving force to both wheel axles. A multiple disc clutch mechanism provided between one of the gear cases, the side gears and the pressure ring limits differential motion of the side gears when the pressure ring is moved in an axial outward direction.

4 Claims, 6 Drawing Sheets

LIMITED SLIP DIFFERENTIAL GEAR

BACKGROUND OF THE INVENTION

1. Field of the Invention

The present invention relates to a limited slip differential gear employed by a vehicle, more particularly to a limited slip differential gear that is small in size, simple in construction and light in weight compared with a conventional limited slip differential gear.

2. Prior Art

A so-called limited slip differential gear (hereinafter referred to as simply LSD) has been conventionally employed by a vehicle so that the vehicle can pull itself out of the mud when one wheel was got stuck in the mud or preventing swerving phenomenon when the vehicle turns.

There is known an LSD of this type, for example, as illustrated in FIG. 8 of Japanese Utility Model Registration No. 3001939.

FIG. 8 schematically shows a cross section of the LSD. In an LSD 01, a ring gear 04 meshing with a drive pinion 02 is fixed to differential gear cases (simply referred to as gear cases) 06a and 06b.

When a driving force of an engine, not shown, is transmitted to the drive pinion 02, the entire gear cases are turned.

A pair of side gears 010a and 010b to be connected with wheel axles 08a and 08b are provided in the gear cases 06a and 06b.

Pinion gears 012a and 012b mesh with each other and turn between the side gears 010a and 010b. Multiple disc clutch mechanisms 024a and 024b are interposed between the gear cases 06a and 06b and the side gears 010a and 010b, wherein they are pressed against each other when a pair of pressure rings 018a and 018b are moved in the axial outward direction so as to limit the differential motion of the side gears 010a and 010b.

The pinion gears 012a and 012b are respectively journaled by pinion shaft ends 016 that protrude vertically in four directions relative to a cross pinion shaft 014. The pinion shaft ends 016 are freely engageably supported and held by the pair of pressure rings 018a and 018b. Cam surfaces, not shown, are formed on both sides of these pinion shaft ends 016, and they can be retained by cam surfaces formed on the tip end portion of the pressure rings 018a and 018b at the surfaces where the cam surfaces formed on the pinion shaft ends 016 confront and contact those formed on the pressure rings 018a and 018b.

Meanwhile, weight reduction of a chassis has been conventionally required to improve fuel economy, and so forth of a car. Particularly, in a racing car, and so forth, the weight reduction of the chassis has been strongly required in view of high speed of a car and an operability of a steering wheel. Accordingly, it has been an important object to reduce the weight of each unit section employed by the car of this type as much as possible. Meanwhile, in the conventional LSD having the construction set forth above, the number of parts of each unit is large, and hence there remains a problem in respect of capacity and weight of the car.

SUMMARY OF THE INVENTION

It is an object of the invention to provide a limited slip differential gear that is simple in construction, small in size, and light in weight by reducing the number of parts constituting the limited slip differential gear.

To achieve the above object, the limited slip differential gear according to a first aspect of the invention comprises a pair of divided gear cases 2a, 2b that are turned by a driving force of an engine, a pressure ring 18 provided in one of the gear cases 2a, 2b and movable in the direction of wheel axles 8a, 8b, pinion shafts 16 each having an end that is freely engageably supported between and held by the pressure ring 18 and the gear cases 2a, 2b, pinion gears 12 rotatably or turnably supported by the pinion shafts 16, a pair of side gears 10a, 10b meshing with the pinion gears 12 to put the pinion gears 12 therebetween for transmitting the driving force to both wheel axles 8a, 8b, and a multiple disc clutch mechanism 24 provided between one of the gear cases 2a, 2b, the side gears 10a, 10b and the pressure ring 18 for limiting differential motion of the side gears when the pressure ring 18 is moved in the axial outward direction.

A limited slip differential gear according to a second aspect of the invention comprises a pair of divided first and second gear cases 2a, 2b that are turned by a driving force of an engine, a pressure ring 18 provided in the second gear case 2b and movable in the direction of wheel axles 8a, 8b, pinion shafts 16 each having an end that is freely engageably supported between and held by recesses 7, 9 of the pressure ring 18 and recessed grooves 5 of the first gear case 2a, pinion gears 12 turnably supported by the pinion shafts 16, a pair of side gears 10a, 10b meshing with the pinion gears 12 to put the pinion gears 12 therebetween for transmitting the driving force to both wheel axles 8a, 8b, and a multiple disc clutch mechanism 24 provided between the second gear case 2b, the side gears 10a, 10b and the pressure ring 18 for limiting differential motion of the side gears when the pressure ring 18 is moved in the axial outward direction, wherein the side gears 10a, 10b can perform differential motion by a pressing force produced when ends of the pinion shafts 16 are pressed against the recesses 7, 9 of the pressure ring 18.

The limited slip differential gear according to a third aspect of the invention is characterized that a differential motion is performed by cam surfaces 7a formed on the recesses 7 the pressure ring 18 and cam surfaces 16a formed on the ends of the pinion shafts 16 in the second aspect of the invention.

The limited slip differential gear according to a fourth aspect of the invention is characterized that a differential motion is performed by two cam surfaces 9a, 9b formed on one of the recesses 9 of the pressure ring 18 and two cam surfaces 16a, 16b formed on the ends of the pinion shafts 16 in the second aspect of the invention.

The limited slip differential gear according to a fifth aspect of the invention is characterized that the pressure ring 18 in the second aspect of the invention has different recesses 7, 9, wherein when the different recesses 7, 9 differently confront recessed grooves 5 of the first gear case 2a to change the differential motion.

PREFERRED EMBODIMENT OF THE INVENTION

A limited slip differential gear according to a preferred embodiment of the invention is now described with reference to the attached drawings.

Figure 1:
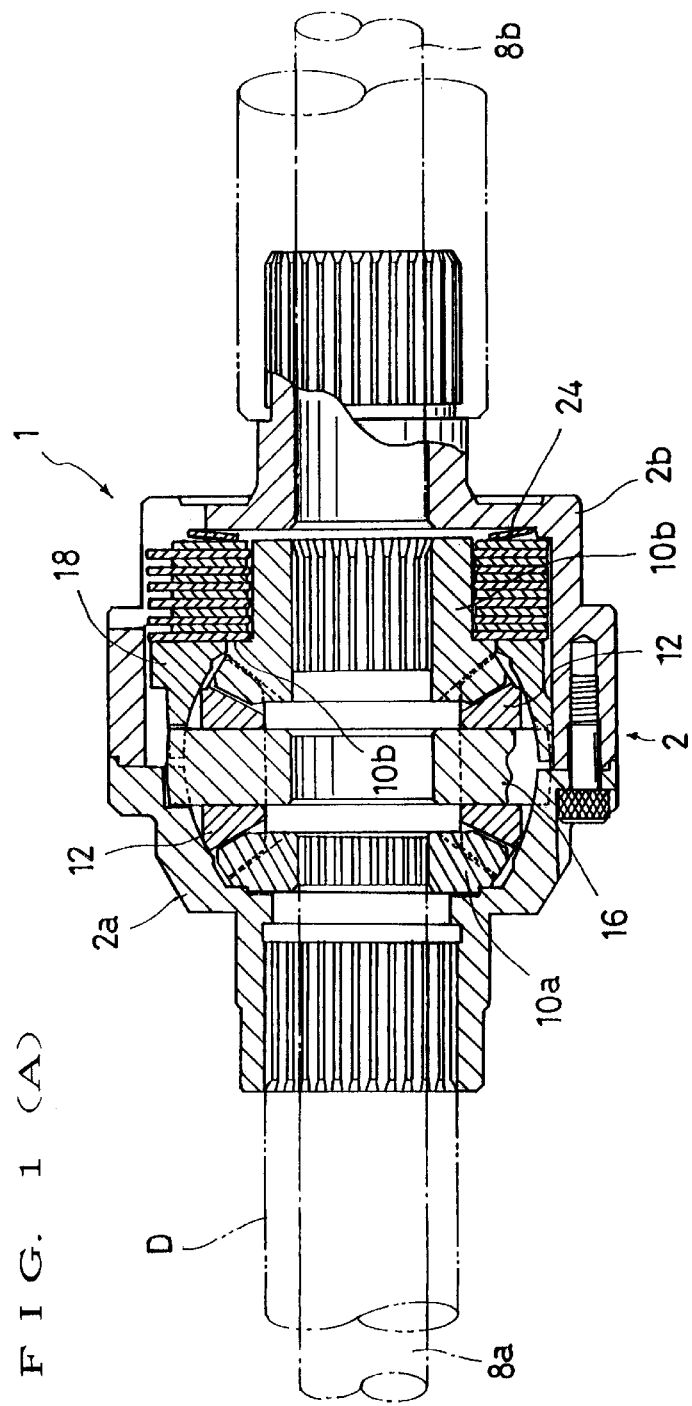
FIG. 1(A) is a sectional view of a limited slip differential gear according to a preferred embodiment of the present invention.
FIG. 1(B) is a view showing a pressure ring as viewed from the outside.
Figure 1:
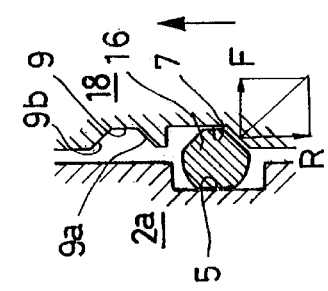

FIGS. 1(A) and 1(B) show a limited slip differential gear (hereinafter referred to as simply LSD) wherein FIG. 1(A) is a sectional view of the LSD and FIG. 1(B) is a view showing a pressure ring as viewed from the outside.

Figure 4:
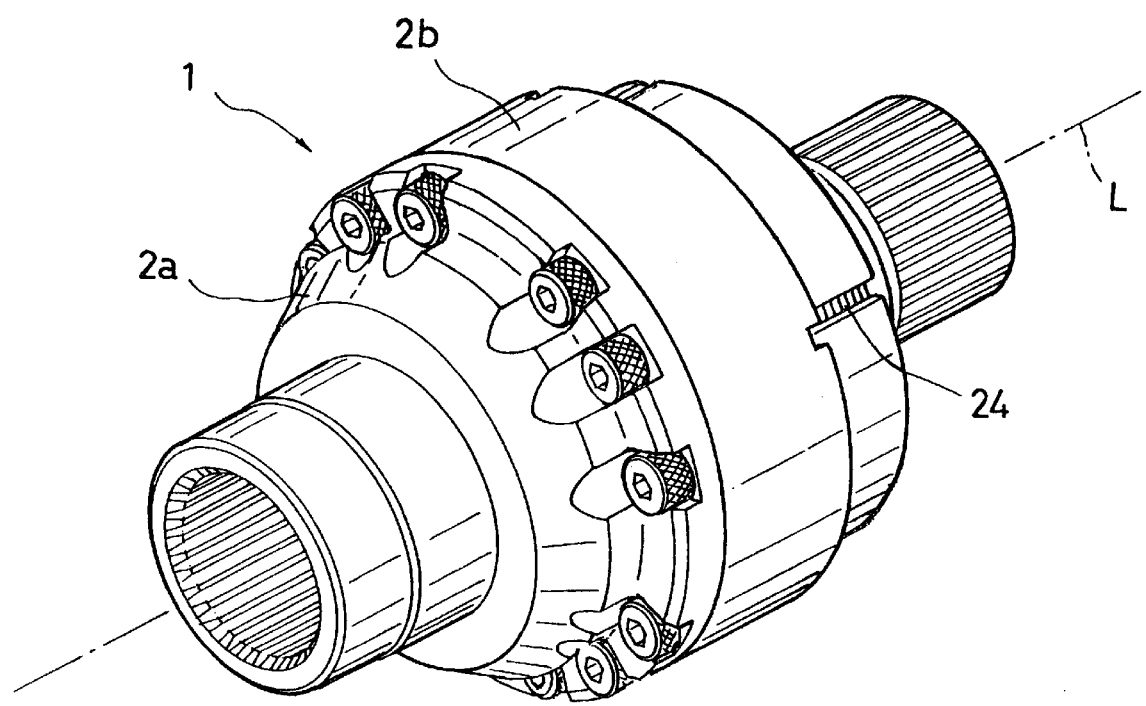
FIG. 4 is an external perspective view of the limited slip differential gear.
Figure 5:
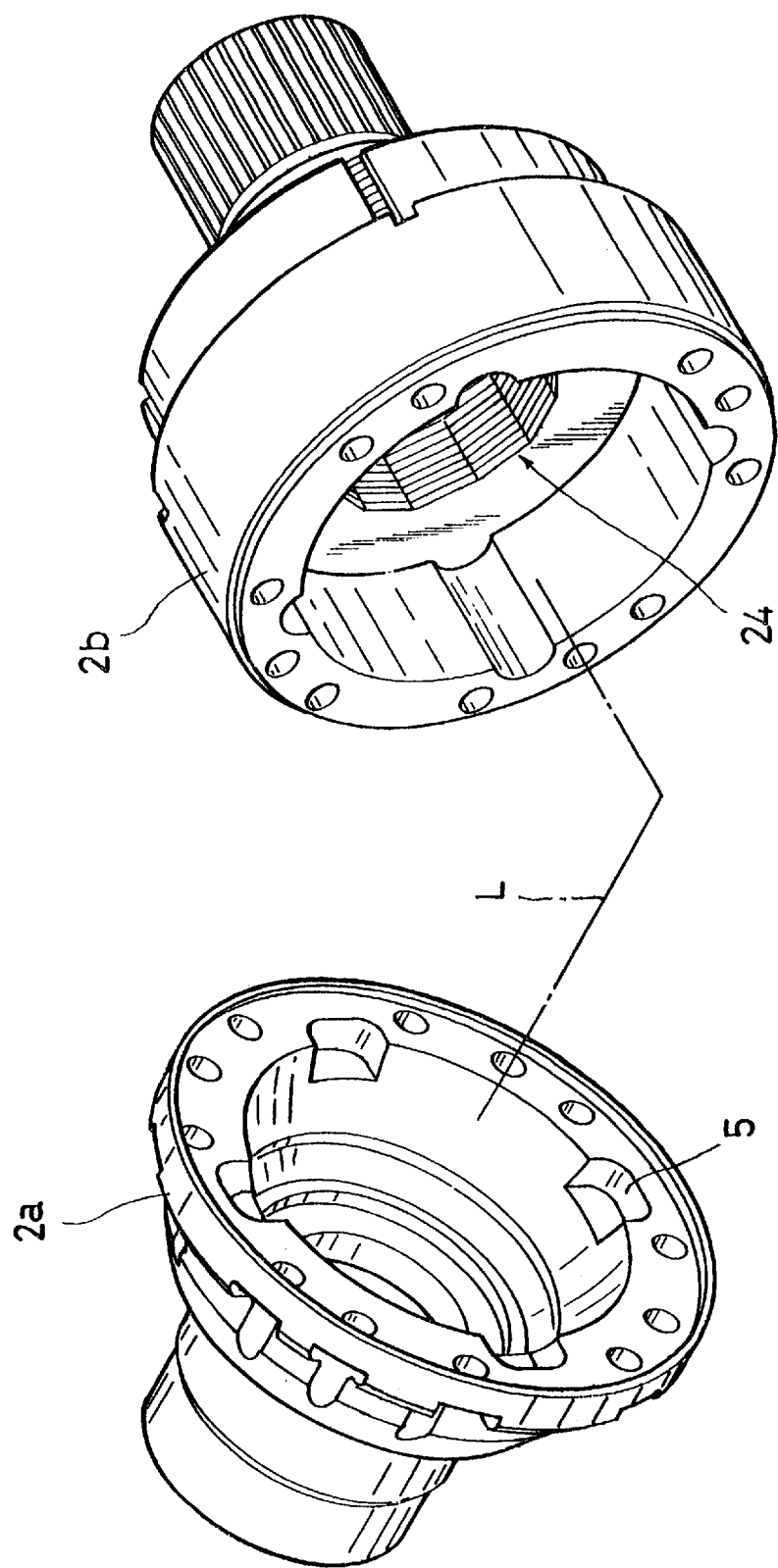
FIG. 5 is a perspective view of gear cases and a pressure ring constituting the limited slip differential gear.
Figure 6:
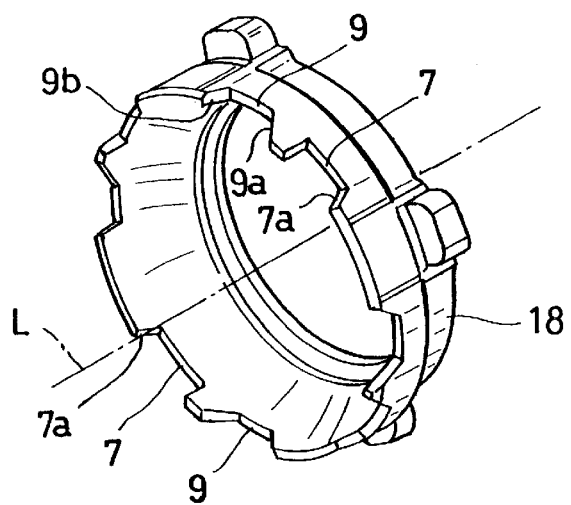
FIG. 6 is a perspective view of the pressure ring.
Figure 7:
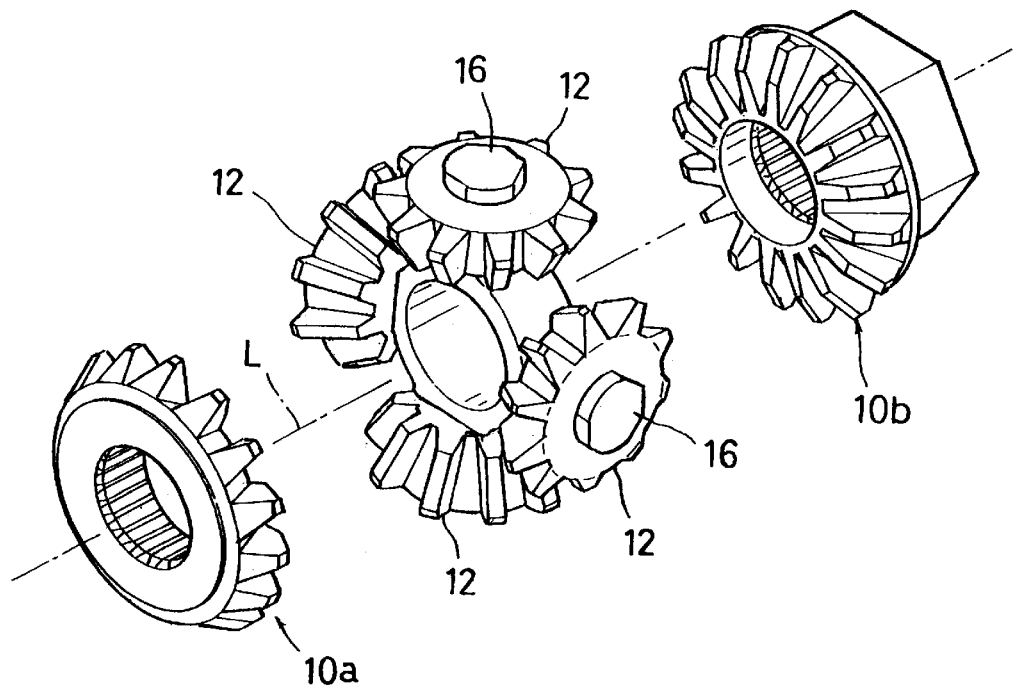
FIG. 7 is an exploded perspective view of the side gears and pinion gears constituting the limited slip differential gear.

Further, FIG. 4 is a perspective view showing the external appearance of the LSD, FIG. 5 shows halved gear cases, FIG. 6 is a perceptive view of the pressure ring and FIG. 7 is an exploded perspective view of both side gears and pinion gears.

As shown in FIG. 1(A), an LSD 1 has a basic structure in which a first gear case 2a fixed to a driving shaft D by a spline is turned and a second gear case 2b connected with the first gear case 2a is also turned when a driving force of an engine is transmitted to a driving shaft D to turn the driving shaft D.

Figure 8:
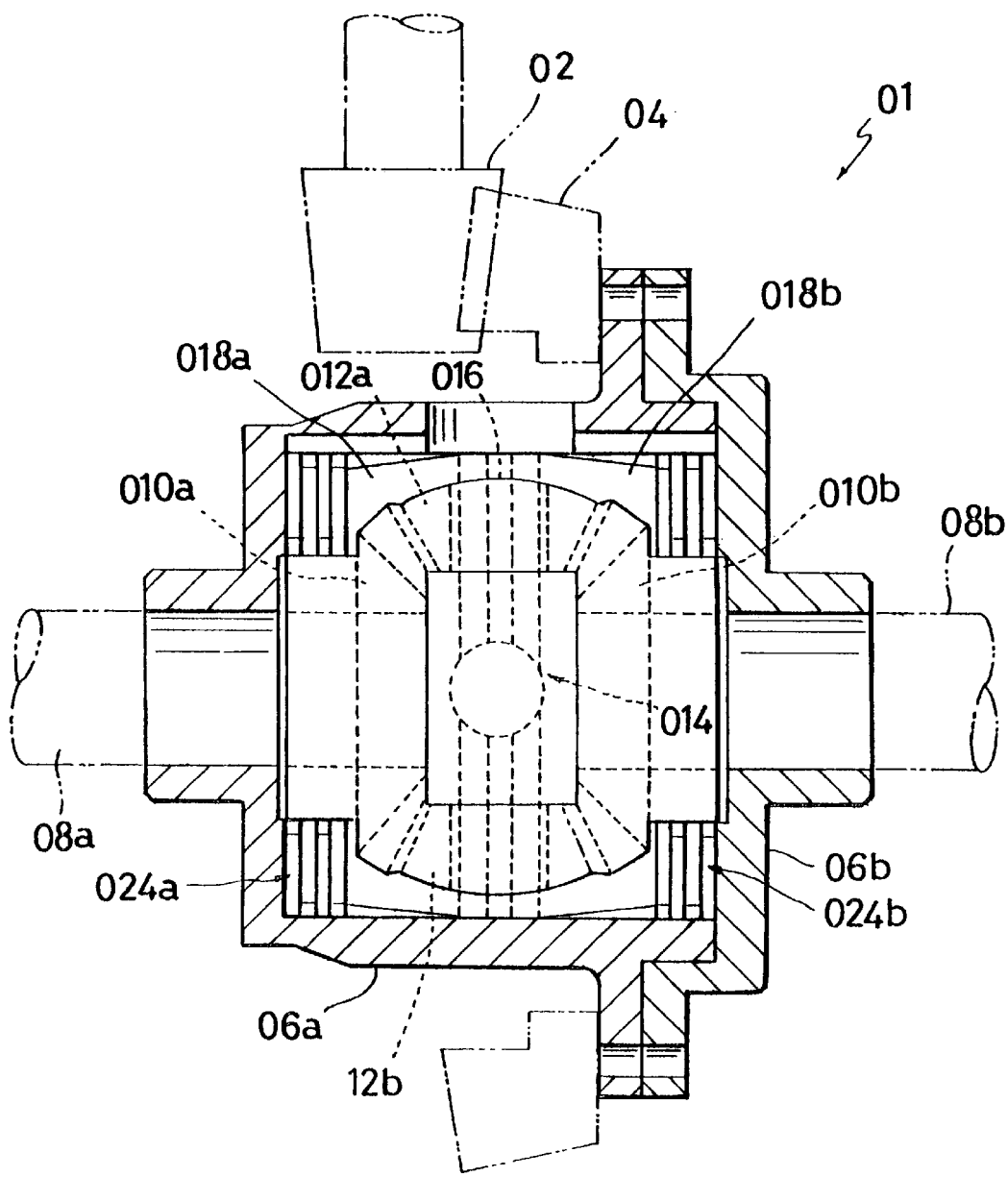
FIG. 8 is a sectional view of a conventional prior art limited slip differential gear.

A gear case 2 comprises the first and second gear cases 2a and 2b as evident from FIGS. 1(A) and 5 and these first and second gear cases 2a and 2b are connected with and fixed to each other by a fixing tool such as bolts V and so forth. The first gear case 2a has a structure formed by integrating the pressure ring 018b in the conventional LSD with the gear case 06b as shown in FIG. 8. As shown in FIGS. 1B and 5, four recessed grooves 5 are formed on the periphery of the first gear case 2a (corresponding to conventional pressure ring 018b) at the end surface to be connected with the second gear case 2b.

The recessed grooves 5 freely engageably support respective one sides of respective end portions of cross pinion shafts 16, described later.

A pressure ring 18 is engageably supported in the first gear case 2a so as to surround the outsides of respective pinion gears 12, described later. That is, the pressure ring 18 is disposed to be axially movable and turnable integrally with the gear case 2a.

Four recesses 7 each having substantially the same shape as each recessed groove 5 are formed on the peripheral end surface of the pressure ring 18 so as to confront the recessed grooves 5 of the gear case 2a. The recesses 7 also freely engageably support one sides of respective end portions of cross pinion shafts 16, described later.

The end portions of the pinion shafts 16 are put between these confronting recessed grooves 5 and recesses 7 while they are freely engaged thereby. The pinion shafts 16 cross at right angles with the wheel axles 8a and 8b to be connected with the gear case 2 and they are supported in the gear case 2. Two pairs of pinion gears 12 are turnably supported by the pinion shafts 16 (see FIG. 7).

Side gears 10a and 10b mesh with the pinion gears 12 to put the pinion gears 12 therebetween in the gear case 2 so as to transmit a driving force to the wheel axles 8a and 8b. A multiple disc clutch mechanism 24 interposed between the inner wall of the second gear case 2b, a shoulder portion 10b1 of the side gear 10a, and the pressure ring 18. The multiple disc clutch mechanism 24 is localized at one side of the side gear while multiple disc clutch mechanisms are conventionally disposed equally on both sides of the side gears (see FIG. 8).

As the multiple disc clutch mechanism 24, known types that are formed by alternating multiply laminating disc clutches composed of a friction disc, a friction plate and so forth. The multiple disc clutch mechanism 24 gives a pressing force to the second gear case 2b so that the side gear 10b is integrally turnable with the second gear case 2b or the side gear 10a is integrally turnable with the first gear case 2a. That is, the multiple disc clutch mechanism 24 limits the differential motion of each side gear.

When the pressure ring 18 disposed at one side is moved in the axial outward direction, the pressing force produced between the side gear 10b and the second gear case 2b or between the side gear 10a and the first gear case 2a is weakened, so that they are not turned while integrated therewith.

That is, the differential motion of the side gears is precisely carried out.

Meanwhile, described next is the operation of respective cams of the pressure ring 18 and those of the pinion shafts 16 that forms the principle of the differential motion.

Figure 2:
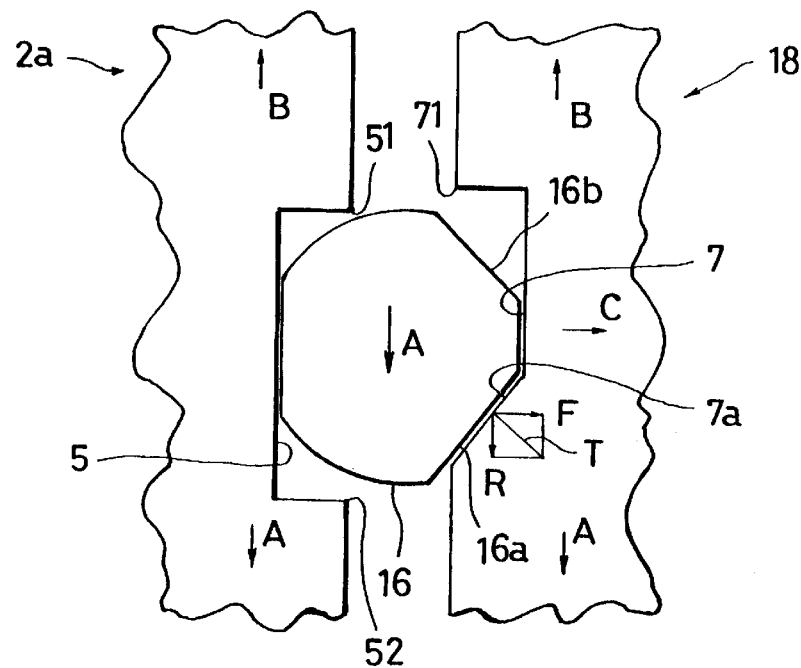
FIG. 2 is a schematic view showing the operation of the cam surfaces which are applied to the limited slip differential gear according to the present invention.

As shown in partial schematic view showing a so-called one way differential motion in FIGS. 1B and 2, the recessed groove 5 provided on the peripheral end surface of the first gear case 2a at the portion to be connected with the second gear case 2b has a U-shape and the corresponding recess 7 of the pressure ring 18 has a shuttle shapes.

A cam surface 7a is formed on the side wall of the recess 7 wherein the cam surface 7a is inclined relative to the vertical surface. An end portion of the pinion shaft 16 is formed in the manner that it freely engages with a part (flat surface) of the recessed groove 5 of the first gear case 2a while they contact with each other. Likewise, the other end portion of the pinion shaft 16 is formed in the manner that they freely engage with a part (flat and inclined surfaces) of the recess 7 of the pressure ring 18 while they contact each other.

The cam surface 16a is formed on the end portion of the pinion shaft 16 at one side wherein it has the same inclined portion as the cam surface 7a of the recess 7 of the pressure ring 18. On the other hand, another cam surface 16b is formed on the end portion of the pinion shaft 16 at the other side, namely, opposite to the cam surface 16a, and its function is described later.

The differential motion of the limited slip differential gear is now described.

In a state where the engine is driven, the turning force is transmitted to the driving shaft D so that the driving shaft D is also turned, thereby turning the first gear case 2a and the second gear case 2b. Accordingly, the pressure ring 18 is turned at the same speed as the first gear case 2a and the second gear case 2b.

Further, the pinion shafts 16 that are put between the recessed groove 5 formed in the first gear case 2a and the recesses 7 formed in the pressure ring 18 are also turned. At this time, the pinion gears 12 move around the wheel axle 8 together with the gear case 2 while turning on their own axes. Such a driving force is transmitted to the first and second gear cases 2a and 2b, the pressure ring 18, the pinion shaft 16, the pinion gears 12 and the side gear 10b and the wheel axle 8 in this order. For example, since the pressure ring 18 is turned in the direction of the arrow B in FIG. 2 when the car moves forward while accelerated when the engine is driven, the cam surface 7a of the recess 7 formed on the pressure ring 18 is brought into contact with the pinion shaft 16 formed on the end portion of the pinion shaft 16 at one side.

FIG. 2 shows a state of contact between the pinion shaft 16 and the first gear case 2a, the pinion shaft 16 and the pressure ring 18 for explaining the relation between the surfaces of these elements while providing gaps therebetween for the convenience of explanation.

However, actually the pinion shaft 16 and the first gear case 2a contact each other at their flat surfaces while the pinion shaft 16 and the pressure ring 18 contact each other at their flat or inclined surfaces. In this case, it is designed that the cam surface 7a of the recess 7 is brought into contact with the cam surface 16a of the pinion shaft 16 before a cornered portion 52 of the first gear case 2a contacts the surface of the pinion shaft 16.

The pressure ring 18 receives a component force F by the pressing force at this time, and it is pushed and opened in the direction of the arrow C to push back the multiple disc clutch mechanism 24. As a result, the pressing force between the side gear 10b (that is connected with the wheel axle 8b by a spline) and the second gear case 2b is weakened, and hence the side gear 10b and the second gear case 2b are integrated with the other and they are not turned. That is, a differential motion acts on the side gear 10b.

Further, for example, if an engine brake operates, the first gear case 2a is turned in the direction of the arrow A in FIG. 2 so that another cornered portion 51 of the first gear case 2a is brought into contact with the surface of the pinion shaft 16. The surface of the pinion shaft 16 is designed that a component force is hardly or slightly produced even if the cornered portion 51 of the first gear case 2a is brought into contact with the pinion shaft 16. At this time, a cornered portion 71 of the pressure ring 18 is designed not to contact the surface of the pinion shaft 16.

Accordingly, since the pressure ring 18 does not receive the component force F or slightly receives the component force F, it is not pushed and opened as mentioned above, and hence the differential motion does not act on the side gear 10b.

If a driving force is applied to the pinion shaft 16 from the wheel side during the forward movement when applying the brake, the end portion of the pinion shaft 16 performs relative movement in the direction of the arrow A so that the same operation in the case of the forward movement while accelerated can be performed. As mentioned in detail above, a so-called one way differential motion is accurately performed between the pinion shaft 16, the pressure ring 18 and the first gear case 2a.

Figure 3:
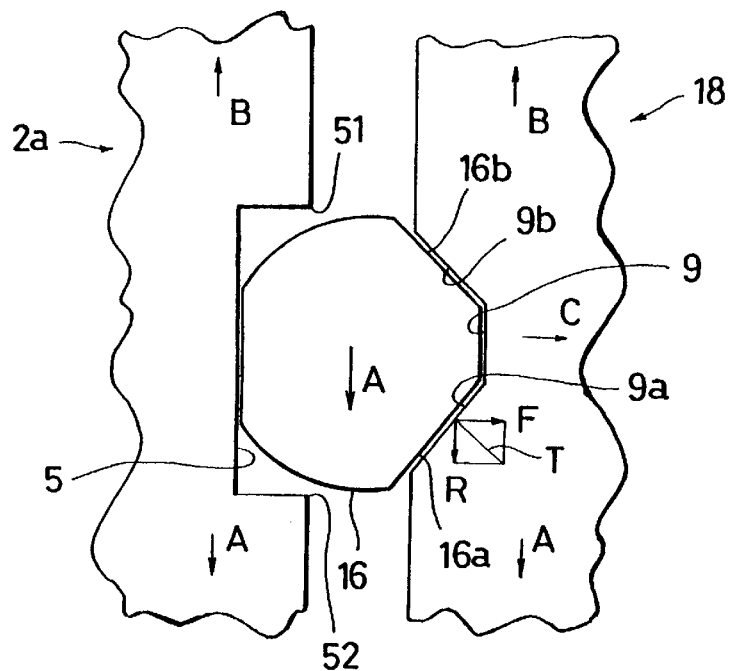
FIG. 3 is a schematic view showing the operation of the other cam surfaces which are applied to the limited slip differential gear according to the present invention.

Meanwhile, as evident from FIG. 1(B) and FIG. 3 (a so-called two way differential motion), cam surfaces having different shapes are formed alternately on the end portion of the pressure ring 18, which is another feature of this invention. The recess 9 having shapes that are different from those of the recess 7 is formed on the end portion of the pressure ring 18 at given intervals. It is a matter of course that the recess 9 is formed on four points corresponding to four recess 7.

The recess 9 has cam surfaces 9a and 9b at both side walls. The cam surface 9b is formed corresponding to the cam surface 16b of the pinion shaft 16 in addition to the cam surface 9a having the same inclination as the cam surface 7a. According to the recess 9 having the construction set forth above, if a car moves forward while accelerated when the engine is driven, the pressure ring 18 is turned in the direction of the arrow B so that the cam surface 9a of the recess 9 is brought into contact with the cam surface 16a of the pinion shaft 16.

FIG. 3 shows a state of contact between the pinion shaft 16 and the first gear case 2a, the pinion shaft 16 and the pressure ring 18 for explaining the relation between the surfaces of these elements while providing gaps therebetween for the convenience of explanation.

However, actually the pinion shaft 16 and the first gear case 2a contact each other at their flat surfaces while the pinion shaft 16 and the pressure ring 18 contact each other at their flat or inclined surfaces.

In this case, it is designed that the cam surface 97a of the recess 9 is brought into contact with the cam surface 16a of the pinion shaft 16 before a cornered portion 52 of the first gear case 2a contacts the surface of the pinion shaft 16.

The pressure ring 18 receives a component force F by the pressing force at this time, and it is pushed and opened in the direction of the arrow C to push back the multiple disc clutch mechanism 24. As a result, the pressing force between the side gear 10b and the second gear case 2b is weakened, the side gear 10b and the second gear case 2b are integrated with the other and they are not turned. That is, a differential motion acts on the side gear 10b.

Further, for example, if an engine brake operates, the first gear case 2a is turned in the direction of the arrow A in FIG. 2 so that the cam surface 9b of the recess 9 is brought into contact with the surface of the pinion shaft 16. In this case, it is designed that the cam surface 9a of the recess 9 is brought into contact with the cam surface 16a of the pinion shaft 16 before a cornered portion 52 of the first gear case 2a contacts the surface of the pinion shaft 16.

The pressure ring 18 receives a component force F by the pressing force at this time, and it is pushed and opened in the direction of the arrow C to push back the multiple disc clutch mechanism 24. As a result, the pressing force between the side gear 10b and the second gear case 2b is weakened, the side gear 10b and the second gear case 2b are integrated with the other and they are not turned. That is, a differential motion or function acts on the side gear 10b.

If a driving force is applied to the pinion shaft 16 from the wheel side during the forward movement when applying the brake, the end portion of the pinion shaft 16 performs relative movement in the direction of the arrow A so that the same operation in the case of the forward movement while accelerated can be performed. As mentioned in detail above, the so-called two way differential motion is accurately performed between the pinion shaft 16, the pressure ring 18 and the first gear case 2a.

According to the present invention, it is possible to selectively change the differential relation in the LSD by partially reassembling the LSD, namely, the recessed groove 5 of the first gear case 2a are rendered to confront the recess 9 instead of the recess 7 of the pressure ring 18 by shifting the pressure ring 18 at a given angle. For example, it is possible to change the differential direction from one way differential motion to two differential motion.

With such a construction, the multiple disc clutch mechanisms that are disposed at both sides of the side gears can be disposed at one side of the side gears, thereby reducing the number of assembling process.

Further, is possible to dispense with the pressure ring disposed at one side while keeping the same function as the conventional LSD. Still further, the shape and length of the side gear at one side can be reduced, and hence the gear case can be made small in size as a matter of course.

The present invention is not limited to the above embodiment but can be applied to various modifications within the scope of the object of the invention. For example, it is needless to say that the gear case, the pressure ring and the cam surfaces of the pinion shafts may have any type if they allow the pressure ring to move in the axial direction.

The limited slip differential gear of the present invention can be made small in size, simple in construction and light in weight by reducing the number of components constituting the limited slip differential gear without changing function thereof. Further, since the limited slip differential gear has the construction that the conventional one pressure ring is integrally provided in one of halved cases, the case and its internal construction can be simplified, thereby reducing the failure rate. Still further, since the different recesses are formed at least on the pressure ring, the freedom of the differential motion of the limited slip differential gear increases by selectively engaging the pinion shaft with the recesses of the pressure ring.

What is claimed is:

1. A limited slip differential gear comprising:

a pair of divided first and second gear cases that are turned by a driving force of an engine;

a pressure ring provided in the second gear case and movable in the direction of wheel axles;

pinion shafts each having an end that is freely engageably supported between the pressure ring and the first gear case and positioned in recesses of the pressure ring and recessed grooves of the first gear case;

pinion gears turnably supported by the pinion shafts;

a pair of side gears meshing with the pinion gears positioned therebetween for transmitting the driving force to the wheel axles; and a multiple disc clutch mechanism provided between the second gear case, the side gears and the pressure ring for limiting differential motion of the side gears when the pressure ring is moved in an axial outward direction;

wherein the side gears are capable of performing differential motion by a pressing force produced when the ends of the pinion shafts are pressed against the recesses of the pressure ring.

2. The limited slip differential gear according to claim 1, wherein differential motion is performed by cam surfaces formed on the recesses of the pressure ring and cam surfaces formed on the ends of the pinion shafts.

3. The limited slip differential gear according to claim 1, wherein differential motion is performed by two cam surfaces formed on one of the recesses of the pressure ring and two cam surfaces formed on the ends of the pinion shafts.

4. The limited slip differential gear according to claim 1, wherein the pressure ring includes different recesses which differently confront the recessed grooves of the first gear case to change a differential motion.

* * * * *